US011886143B2

(12) United States Patent
Sugiyama et al.

(10) Patent No.: US 11,886,143 B2
(45) Date of Patent: Jan. 30, 2024

(54) SHEET LAMINATOR, IMAGE FORMING APPARATUS, AND SHEET LAMINATING METHOD

(71) Applicants: Keisuke Sugiyama, Kanagawa (JP); Tomohiro Furuhashi, Kanagawa (JP); Wataru Takahashi, Tokyo (JP); Ruki Midorikawa, Kanagawa (JP); Shinya Monma, Kanagawa (JP); Sho Asano, Kanagawa (JP)

(72) Inventors: Keisuke Sugiyama, Kanagawa (JP); Tomohiro Furuhashi, Kanagawa (JP); Wataru Takahashi, Tokyo (JP); Ruki Midorikawa, Kanagawa (JP); Shinya Monma, Kanagawa (JP); Sho Asano, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/061,232

(22) Filed: Dec. 2, 2022

(65) Prior Publication Data
US 2023/0221672 A1     Jul. 13, 2023

(30) Foreign Application Priority Data
Jan. 13, 2022     (JP) ................ 2022-003616

(51) Int. Cl.
G03G 15/20     (2006.01)
G03G 15/00     (2006.01)
(Continued)

(52) U.S. Cl.
CPC ..... *G03G 15/6585* (2013.01); *B32B 37/0053* (2013.01); *B32B 41/00* (2013.01); *B32B 2037/0069* (2013.01); *B32B 2250/03* (2013.01)

(58) Field of Classification Search
CPC ............... G03G 15/20; G03G 15/6558; B32B 37/0053; B32B 41/00
(Continued)

(56) References Cited

U.S. PATENT DOCUMENTS

2020/0247636 A1   8/2020  Furuhashi et al.
2022/0291620 A1   9/2022  Fujita et al.

FOREIGN PATENT DOCUMENTS

CN    101226462   *   9/2011
JP    2010-089866      4/2010
(Continued)

Primary Examiner — Hoan H Tran
(74) Attorney, Agent, or Firm — Harness, Dickey & Pierce, P.L.C.

(57) ABSTRACT

A sheet laminator laminates a two-ply sheet and a sheet-shaped medium inserted in the two-ply sheet. The sheet laminator includes a sheet feeder, a multi-feeding detector, a fixing device, an ejection device, a purging portion, a passage switcher, and circuitry. The sheet feeder feeds the two-ply sheet. The multi-feeding detector detects multiple feeding of the two-ply sheet. The fixing device fixes the two-ply sheet by application of heat and pressure. The ejection device ejects the two-ply sheet that has been fixed by the fixing device. The purging portion is disposed at a position different from the ejection device. The passage switcher switches a conveyance passage of the two-ply sheet to the fixing device or to the purging portion. The circuitry conveys the two-ply sheet to the purging portion and retries sheet feeding with another two-ply sheet, in response to detection of multiple feeding of the two-ply sheet.

12 Claims, 15 Drawing Sheets

(51) Int. Cl.
  *B32B 37/00* (2006.01)
  *B32B 41/00* (2006.01)

(58) Field of Classification Search
  USPC .......................................................... 399/342
  See application file for complete search history.

(56) References Cited

FOREIGN PATENT DOCUMENTS

| | | | |
|---|---|---|---|
| JP | 2019119565 | * | 7/2019 |
| JP | 2020-121868 | | 8/2020 |
| JP | 2021-143072 | | 9/2021 |

* cited by examiner

SHEET LAMINATOR, IMAGE FORMING APPARATUS, AND SHEET LAMINATING METHOD

CROSS-REFERENCE TO RELATED APPLICATION

This patent application is based on and claims priority pursuant to 35 U.S.C. § 119(a) to Japanese Patent Application No. 2022-003616, filed on Jan. 13, 2022, in the Japan Patent Office, the entire disclosure of which is hereby incorporated by reference herein.

BACKGROUND

Technical Field

Embodiments of the present disclosure relate to a sheet laminator, an image forming apparatus, and a sheet laminating method.

Background Art

Lamination technologies have been proposed that insert an inner sheet (e.g., paper or photo) between a two-ply sheet (e.g., a lamination sheet or a lamination film) and apply heat and pressure to the two-ply sheet to bond the two-ply sheet. The two-ply sheet is made of two sheets (plies) bonded (sealed) on one side as if one sheet is folded.

In a sheet laminator in the related art, there is known a configuration in which when an abnormality during conveyance of a laminate sheet is detected, the laminate sheet is conveyed to a retraction passage different from a normal conveyance passage and stored.

For example, a configuration or structure has been disclosed that has a branched retraction passage in addition to a normal ejection passage, and when separation of a laminate film is not appropriately performed, the lamination film is conveyed to the retraction passage.

Another configuration or structure has been disclosed that easily perform processing of sheets of multiple feeding. An image forming apparatus having this configuration or structure includes a multiple feeding detector and a sheet conveyance member. When the multiple feeding detector detects multiple feeding of sheets, the image forming apparatus performs sheet feeding and conveyance by determining load applied to the sheet conveyance member and conveying the sheets to respective sheet conveyance passages depending on the load amounts of the sheets.

As described above, when the multiple feeding of sheets occurs, the sheets are retracted to a sheet conveyance passage (e.g., a purge tray) different from the sheet conveyance passages used when no multiple feeding of sheets occurs. By so doing, the usability of the image forming apparatus (i.e., the easy handling of abnormality by a user) can be enhanced.

SUMMARY

Embodiments of the present disclosure described herein provide a novel sheet laminator that laminates a two-ply sheet in which two sheets are overlapped and bonded together at one end of the two-ply sheet and a sheet-shaped medium inserted between the two sheets of the two-ply sheet. The sheet laminator includes a sheet feeder, a multi-feeding detector, a fixing device, an ejection device, a purging portion, a passage switcher, and circuitry. The sheet feeder feeds the two-ply sheet. The multi-feeding detector is disposed downstream from the sheet feeder in a conveyance direction in which the two-ply sheet is conveyed. The multi-feeding detector detects multiple feeding of the two-ply sheet. The fixing device is disposed downstream from the multi-feeding detector in the conveyance direction. The fixing device fixes the two-ply sheet by application of heat and pressure. The ejection device is disposed downstream from the fixing device in the conveyance direction. The ejection device ejects the two-ply sheet that has been fixed by the fixing device. The purging portion is disposed at a position different from the ejection device and includes a retracted sheet conveyance passage branched at a point upstream from the fixing device in the conveyance direction. The passage switcher is disposed upstream from the fixing device and the purging portion in the conveyance direction. The passage switcher switches a conveyance passage of the two-ply sheet to the fixing device or to the purging portion. The circuitry conveys the two-ply sheet to the purging portion and retries sheet feeding with another two-ply sheet, in response to detection of multiple feeding of the two-ply sheet.

Further, embodiments of the present disclosure described herein provide an image forming apparatus including the above-described sheet laminator and an image forming device that forms an image on a sheet.

Further, embodiments of the present disclosure described herein provide a sheet laminating method of laminating a two-ply sheet in which two sheets are overlapped and bonded together at one end of the two-ply sheet and a sheet-shaped medium inserted between the two sheets of the two-ply sheet. The sheet laminating method includes feeding the two-ply sheet, fixing the two-ply sheet by application of heat and pressure, ejecting the two-ply sheet that has been fixed by the fixing to an ejection device, and, in response to detection of multiple feeding of the two-ply sheet in the feeding, conveying the two-ply sheet to the purging portion without performing the fixing, and retrying sheet feeding with another two-ply sheet.

BRIEF DESCRIPTION OF THE SEVERAL VIEWS OF THE DRAWINGS

Exemplary embodiments of this disclosure will be described in detail based on the following figures, wherein.

Figure 1:
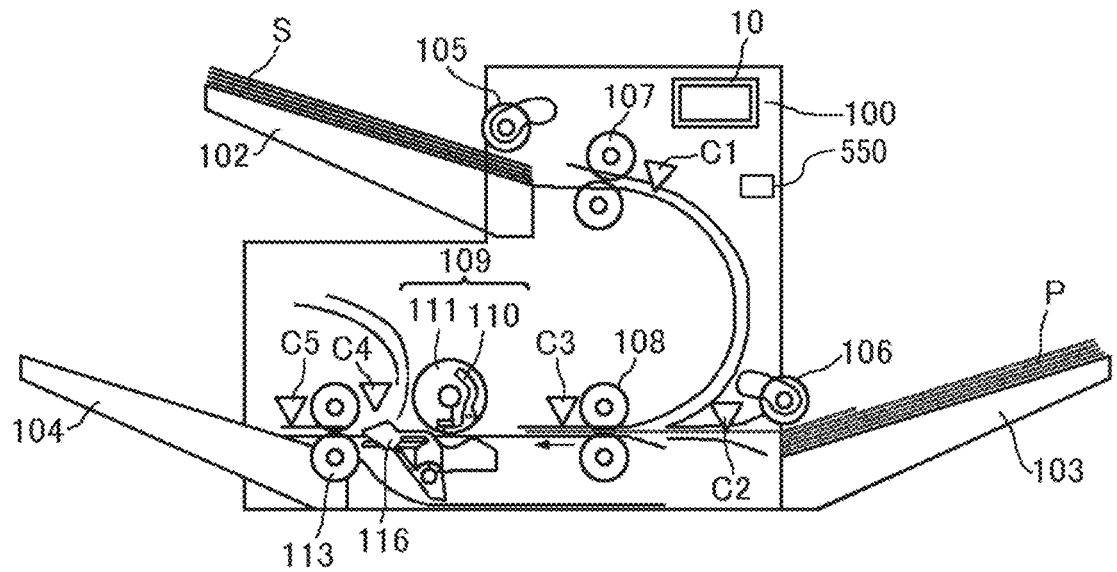
FIG. 1 is a schematic diagram illustrating an overall configuration of a sheet processing device according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

It will be understood that if an element or layer is referred to as being "on," "against," "connected to" or "coupled to" another element or layer, then it can be directly on, against, connected or coupled to the other element or layer, or intervening elements or layers may be present. In contrast, if an element is referred to as being "directly on," "directly connected to" or "directly coupled to" another element or layer, then there are no intervening elements or layers present. As used herein, the term "connected/coupled" includes both direct connections and connections in which there are one or more intermediate connecting elements. Like numbers refer to like elements throughout. As used herein, the term "and/or" includes any and all combinations of one or more of the associated listed items.

Spatially relative terms, such as "beneath," "below," "lower," "above," "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

The terminology used herein is for describing particular embodiments and examples and is not intended to be limiting of exemplary embodiments of this disclosure. As used herein, the singular forms "a," "an," and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Referring now to the drawings, embodiments of the present disclosure are described below. In the drawings for explaining the following embodiments, the same reference codes are allocated to elements (members or components) having the same function or shape and redundant descriptions thereof are omitted below.

Next, a description is given of a configuration and functions of a sheet laminator, an image forming apparatus, and a sheet laminating method, according to an embodiment of the present disclosure, with reference to drawings. Note that identical parts or equivalents are given identical reference numerals and redundant descriptions are summarized or omitted accordingly.

Embodiments of the present disclosure are described below with reference to the attached drawings.

First, a description is given of a sheet processing device according to the present disclosure.

FIG. 1 is a schematic diagram illustrating the overall configuration of a sheet processing device according to an embodiment of the present disclosure.

A sheet processing device 100 according to the present embodiment separates two sheets (plies) of a two-ply sheet (hereinafter referred to as a "two-ply sheet S") to insert and nip a sheet-shaped medium (hereinafter referred to as an "inner sheet P") between the separated sheets of the two-ply sheet S.

The two-ply sheet S is a two-ply sheet in which two sheets are overlapped and bonded together at a portion (or a side) of the two-ply sheet. For example, there is a two-ply sheet in which a first side is a transparent sheet such as a transparent polyester sheet and the opposite side is a transparent or opaque sheet and bonded to the other sheet on one side of the two-ply sheet. The two-ply sheet also includes a lamination film.

The inner sheet P is an example of the sheet-shaped medium that is inserted into the two-ply sheet. The sheet medium may be, for example, thick paper, postcards, envelopes, plain paper, thin paper, coated paper, art paper, tracing paper, and overhead projector (OHP) transparencies.

As illustrated in FIG. 1, a sheet processing device 100 includes a sheet tray 102, a pickup roller 105, and a conveyance roller pair 107. The sheet tray 102 serving as a first sheet stacker on which the two-ply sheets S are placed. The pickup roller 105 feeds the two-ply sheet S from the sheet tray 102. The sheet processing device 100 further includes a sheet tray 103 as a second sheet stacker on which the inner sheet P is stacked, and a pickup roller 106 that feeds the inner sheet P from the sheet tray 103.

A sheet conveyance sensor C1 is disposed downstream from the conveyance roller pair 107 in the sheet conveyance direction to detect the sheet conveyance position of the two-ply sheet S. A sheet conveyance sensor C2 is disposed downstream from the pickup roller 106 in the sheet conveyance direction to detect the sheet conveyance position of the inner sheet P.

The sheet processing device 100 further includes an entrance roller pair 108 as a first conveyor, a winding roller 109 as a rotator, an exit roller pair 113 as a second conveyor, and a sheet ejection tray 104. The entrance roller pair 108, the winding roller 109, the exit roller pair 113, and the sheet ejection tray 104 are disposed downstream from the conveyance roller pair 107 and the pickup roller 106 in the sheet conveyance direction. The sheet processing device 100 further includes a separation claw 116 between the winding roller 109 and the exit roller pair 113. The separation claw 116 is movable in the width direction of the two-ply sheet S.

A sheet conveyance sensor C3 is disposed downstream from the entrance roller pair 108 in the sheet conveyance direction to detect the conveyance position of the two-ply sheet S and the sheet conveyance position of the inner sheet P. An abnormality detection sensor C4 is disposed downstream from the winding roller 109 in the sheet conveyance direction to detect the condition of the two-ply sheet S. A sheet conveyance sensor C5 is disposed downstream from the exit roller pair 113 in the sheet conveyance direction to detect the sheet conveyance position of the two-ply sheet S.

Each of the pickup roller 105, the conveyance roller pair 107, the entrance roller pair 108, and the winding roller 109 serves as a first sheet feeder, and each of the pickup roller 106, the entrance roller pair 108, and the winding roller 109 serves as a second sheet feeder.

An operation panel 10 is provided on the exterior of the sheet processing device 100. The operation panel 10 serves as an operation device or a display-operation device to display information of the sheet processing device 100 and receives input of the operation of the sheet processing device 100. The operation panel 10 also serves as a notification device to output a perceptual signal to a user. As an alternative, a notification device other than the operation panel 10 may be separately provided in the sheet processing device 100.

The sheet processing device 100 according to the present embodiment loads two-ply sheets S and inner sheets P on separate trays. As a two-ply sheet S is conveyed in the sheet processing device 100, the sheet processing device 100 separates and opens the two-ply sheet S into two sheets and inserts the inner sheet P into an opening of the two-ply sheet S. Then, the exit roller pair 113 ejects the two-ply sheet S in which the inner sheet P is inserted, to stack the ejected two-ply sheet S onto the sheet ejection tray 104. The sheet processing device 100 further includes a controller 550 that controls sheet conveyance of the sheet (i.e., the two-ply sheet S and the inner sheet P) by performing, e.g., a sheet separating operation, a sheet inserting operation, and a sheet laminating operation. The controller 550 is connected to various drivers driving various parts and units, for example, the above-described parts and units included in the sheet processing device 100.

Figure 2:
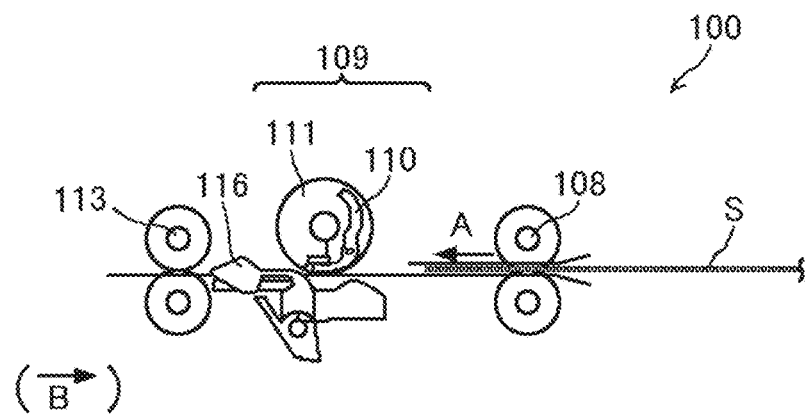
FIG. 2 is a schematic view of a main part of the sheet processing device of FIG. 1 in an operation of conveyance of a sheet.

FIG. 2 is a schematic view of the main part of the sheet processing device 100 of FIG. 1 in an operation of conveyance of a sheet.

As illustrated in FIG. 2, each of the entrance roller pair 108 and the exit roller pair 113 is, for example, two rollers paired with each other and driven by a driver such as a motor. The controller 550 causes the driver to control rotations of the entrance roller pair 108 and the exit roller pair 113. The entrance roller pair 108 rotates in one direction. The exit roller pair 113 rotates in forward and reverse directions, thereby nipping and conveying the two-ply sheet S and the inner sheet P.

The entrance roller pair 108 conveys the two-ply sheet S and the inner sheet PM toward the exit roller pair 113.

The sheet conveyance direction indicated by arrow A in FIG. 2 is hereinafter referred to as a "forward conveyance direction" or a sheet conveyance direction A.

On the other hand, the exit roller pair 113 can switch the direction of rotation between the forward conveyance direction and the reverse conveyance direction that is a direction opposite to the forward conveyance direction. The exit roller pair 113 conveys the two-ply sheet S nipped by the rollers of the exit roller pair 113 toward the sheet ejection tray 104 (see FIG. 1) in the forward conveyance direction and also conveys the two-ply sheet S toward the winding roller 109 in the reverse conveyance direction (to convey the two-ply sheet S in reverse). The sheet conveyance direction of the two-ply sheet S toward the winding roller 109 (in other words, the reverse conveyance direction opposite to the forward conveyance direction) indicated by arrow B in FIG. 2 is hereinafter referred to as a reverse conveyance direction or a sheet conveyance direction B.

The sheet processing device 100 is provided with the winding roller 109 as a rotator and the separation claws 116. The winding roller 109 and the separation claws 116 are disposed between the entrance roller pair 108 and the exit roller pair 113. The winding roller 109 is driven by a driver such as a motor to rotate in the forward and reverse directions. The controller 550 switches the direction of rotation of the winding roller 109 between the forward conveyance direction (clockwise direction) and the reverse conveyance direction (counterclockwise direction).

The winding roller 109 includes a roller 111 and a sheet gripper 110 movably disposed on the roller 111 to grip the two-ply sheet S. The sheet gripper 110 that is movable grips the leading end of the two-ply sheet S between the sheet gripper 110 and the roller 111. The sheet gripper 110 may be formed on the outer circumference of the roller 111 as a single unit or may be formed as a separate unit. The controller 550 causes a driver to move the sheet gripper 110.

A description is given of a series of operations performed in the sheet processing device 100, with reference to FIGS. 1 to 12B. The series of operations performed by the sheet processing device 100 indicates the operations from separating the two-ply sheet S to inserting the inner sheet P into the two-ply sheet S. The controller 550 controls the series of operations performed by the sheet processing device 100. In FIGS. 3 to 12, elements identical to those illustrated in FIG. 1 or 2 are given identical reference numerals, and the descriptions thereof are omitted.

Figure 3:
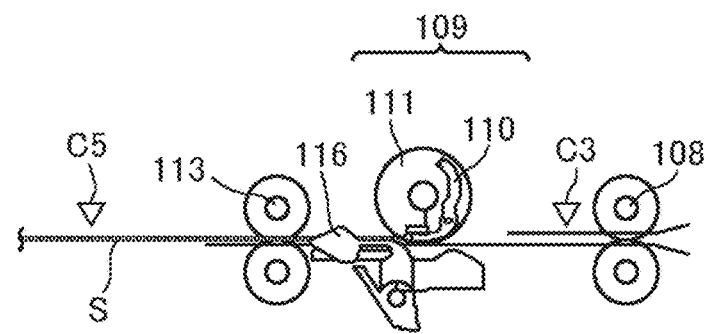
FIG. 3 is a schematic view of the main part of the sheet processing device in an operation subsequent to the operation illustrated in FIG. 2.

FIG. 3 is a schematic view of the main part of the sheet processing device 100 in an operation subsequent to the operation illustrated in FIG. 2.

Figure 4:
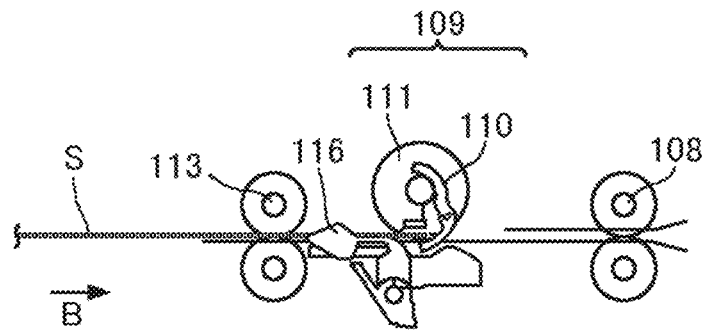
FIG. 4 is a schematic view of the main part of the sheet processing device in an operation subsequent to the operation illustrated in FIG. 3.

FIG. 4 is a schematic view of the main part of the sheet processing device 100 in an operation subsequent to the operation illustrated in FIG. 3.

Figure 5:
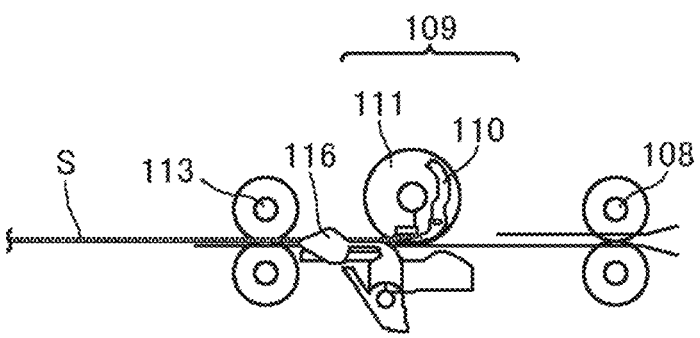
FIG. 5 is a schematic view of the main part of the sheet processing device in an operation subsequent to the operation illustrated in FIG. 4.

FIG. 5 is a schematic view of the main part of the sheet processing device 100 in an operation subsequent to the operation illustrated in FIG. 4.

Figure 6:
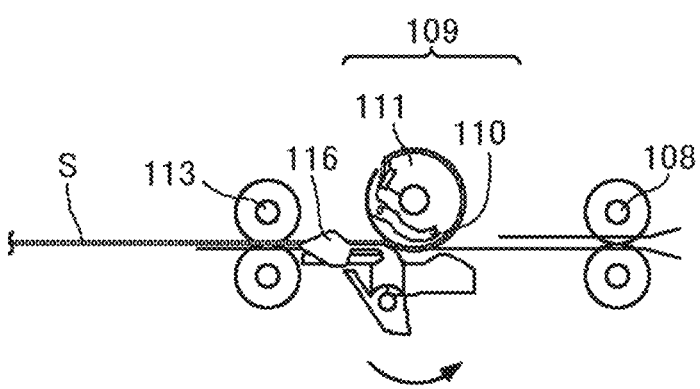
FIG. 6 is a schematic view of the main part of the sheet processing device in an operation subsequent to the operation illustrated in FIG. 5.

FIG. 6 is a schematic view of the main part of the sheet processing device 100 in an operation subsequent to the operation illustrated in FIG. 5.

Figure 7:
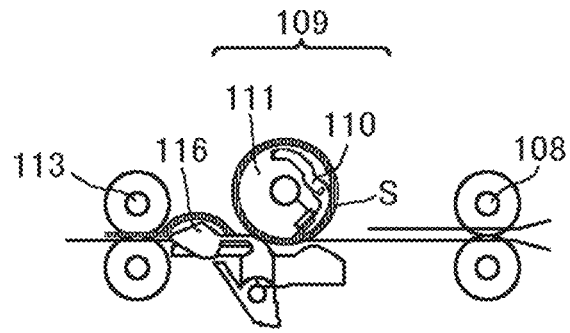
FIG. 7 is a schematic view of the main part of the sheet processing device in an operation subsequent to the operation illustrated in FIG. 6.

FIG. 7 is a schematic view of the main part of the sheet processing device 100 in an operation subsequent to the operation illustrated in FIG. 6.

Figure 8:
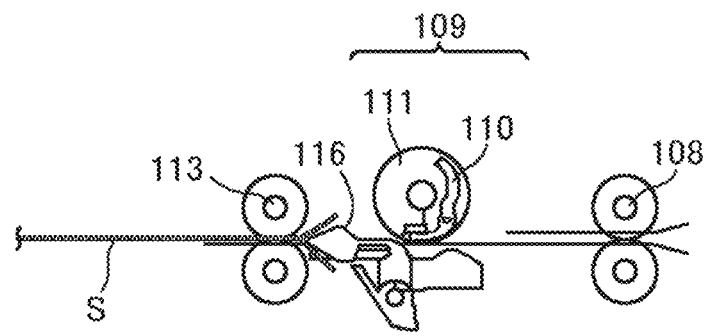
FIG. 8 is a schematic view of the main part of the sheet processing device in an operation subsequent to the operation illustrated in FIG. 7.

FIG. 8 is a schematic view of the main part of the sheet processing device 100 in an operation subsequent to the operation illustrated in FIG. 7.

Figure 9:
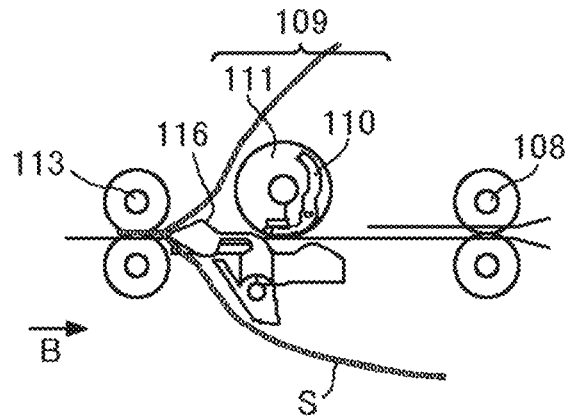
FIG. 9 is a schematic view of the main part of the sheet processing device in an operation subsequent to the operation illustrated in FIG. 8.

FIG. 9 is a schematic view of the main part of the sheet processing device 100 in an operation subsequent to the operation illustrated in FIG. 8.

Figure 10:
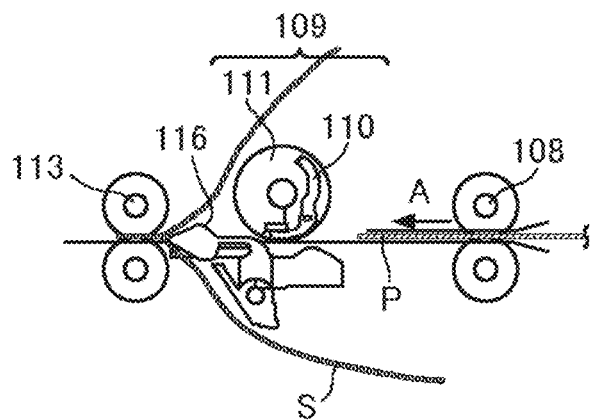
FIG. 10 is a schematic view of the main part of the sheet processing device in an operation subsequent to the operation illustrated in FIG. 9.

FIG. 10 is a schematic view of the main part of the sheet processing device 100 in an operation subsequent to the operation illustrated in FIG. 9.

Figure 11:
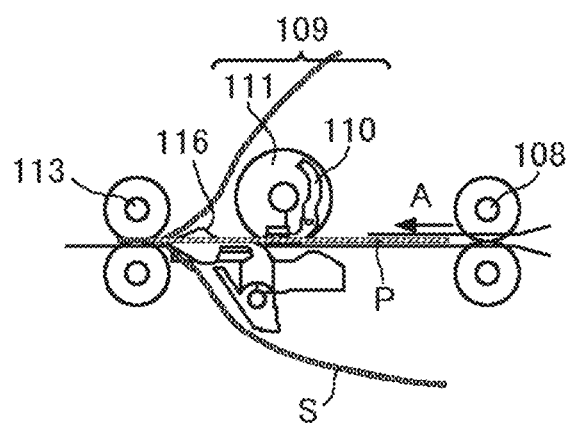
FIG. 11 is a schematic view of the main part of the sheet processing device in an operation subsequent to the operation illustrated in FIG. 10.

FIG. 11 is a schematic view of the main part of the sheet processing device 100 in an operation subsequent to the operation illustrated in FIG. 10.

Figure 12A:
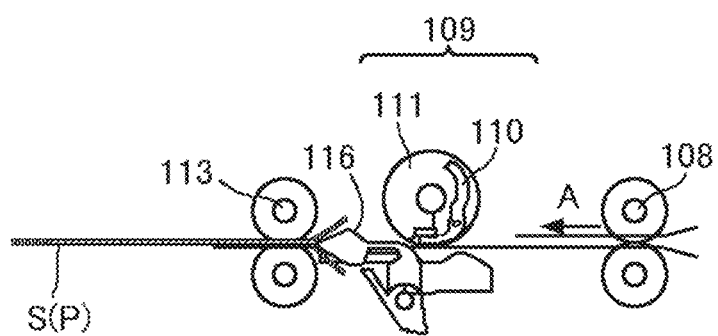
FIGS. 12A and 12B are schematic views, each illustrating the main part of the sheet processing device in an operation subsequent to the operation illustrated in FIG. 11.
Figure 12B:
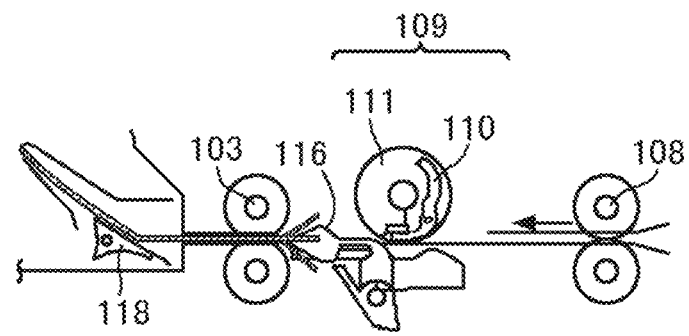

FIGS. 12A and 12B are schematic views, each illustrating the main part of the sheet processing device 100 in an operation subsequent to the operation illustrated in FIG. 11.

In FIG. 1, the two-ply sheets S is loaded on the sheet tray 102 such that a part of the bonded side of the two-ply sheet S is located downstream from the pickup roller 105 in the sheet feed direction (sheet conveyance direction). In the sheet processing device 100, the pickup roller 105 picks up the two-ply sheet S from the sheet tray 102, and the conveyance roller pair 107 conveys the two-ply sheet S toward the entrance roller pair 108.

As illustrated in FIG. 2, the entrance roller pair 108 conveys the two-ply sheet S toward the winding roller 109. In the sheet processing device 100, the entrance roller pair 108 conveys the two-ply sheet S with the bonded end, which is one of four sides of the two-ply sheet S, as the downstream side in the forward conveyance direction A as indicated by arrow A in FIG. 2.

Subsequently, as illustrated in FIG. 3, the sheet processing device 100 temporarily stops conveyance of the two-ply sheet S when the trailing end of the two-ply sheet S in the forward conveyance direction has passed the winding roller 109. These operations are performed by conveying the two-ply sheet S from the sheet conveyance sensor C3 by a designated amount in response to the timing at which the sheet conveyance sensor C3 detected the leading end of the two-ply sheet S.

As illustrated in FIG. 4, the sheet processing device 100 causes the sheet gripper 110 to open and the exit roller pair 113 to rotate in the reverse direction to convey the two-ply sheet S in the reverse conveyance direction (i.e., the reverse conveyance direction B) toward an opening portion of the sheet gripper 110.

Subsequently, as illustrated in FIG. 5, the sheet processing device 100 causes the exit roller pair 113 to stop rotating and conveyance of the two-ply sheet S when the trailing end of the two-ply sheet S is inserted into the opening portion of the sheet gripper 110, and causes the sheet gripper 110 to close and grip the trailing end of the two-ply sheet S. These operations are performed when the two-ply sheet S is conveyed by the designated amount.

Then, as illustrated in FIG. 6, the sheet processing device 100 causes the driver to rotate the winding roller 109 in the counterclockwise direction in FIG. 6 to wind the two-ply sheet S around the winding roller 109. The two-ply sheet S is wound around the winding roller 109 from the side where the two sheets of the two-ply sheet S are overlapped but not bonded.

As illustrated in FIG. 7, when the two-ply sheet S that is the two-ply sheet is wound around the winding roller 109, a winding circumferential length difference is created between the two sheets in the amount of winding of the two-ply sheet S around the circumference of the winding roller 109. There is a surplus of the sheet on the inner circumferential side to the center of the winding roller 109, which generates a slack toward the bonded end. As a result, a space is created between the two sheets constructing the two-ply sheet S. As the separation claws 116 are inserted into the space generated as described above, from both sides of the two-ply sheet S, the space between the two sheets is reliably maintained. In response to detection of the leading end of the two-ply sheet S with the sheet conveyance sensor C5, the two-ply sheet S is conveyed from the sheet conveyance sensor C5 by a designated amount to perform these operations.

With the separation claws 116 inserted in the space in the two-ply sheet S (see FIG. 7), the sheet processing device 100 causes the winding roller 109 to rotate in the clockwise direction and shift the space formed in the two-ply sheet S to the trailing end of the two-ply sheet S in the forward conveyance direction (i.e., the direction A), as illustrated in FIG. 8. After the winding roller 109 has been rotated by a designated amount, the controller 550 causes the driver to open the sheet gripper 110. As a result, the trailing end of the two-ply sheet S is separated into the upper and lower sheets.

While the trailing end of the two-ply sheet S is separated into the upper and lower sheets, the sheet processing device 100 temporarily stops the conveyance of the two-ply sheet S and further moves the separation claws 116 in the width direction of the two-ply sheet S to separate the whole area of the trailing end of the two-ply sheet S. In response to detection of the leading end of the two-ply sheet S with the sheet conveyance sensor C5, the two-ply sheet S is conveyed from the sheet conveyance sensor C5 by a designated amount to perform these operations.

Subsequently, as illustrated in FIG. 9, after the separation claws 116 have separated the whole area of the trailing end of the two-ply sheet S, the controller 550 of the sheet processing device 100 causes the driver to rotate the exit roller pair 113 in the counterclockwise direction in FIG. 9 to convey the two-ply sheet S in the reverse conveyance direction (i.e., the reverse conveyance direction B). In other words, the separation claws 116 guide the two sheets separated from the two-ply sheet S in the upper and lower directions (vertically), respectively, and thus the two sheets are fully separated.

The sheet processing device 100 temporarily stops the conveyance of the two-ply sheet S, so that the bonded portion of the two-ply sheet S is gripped (nipped) by the exit roller pair 113. Accordingly, one end of the two-ply sheet S is bonded as the bonded side of the two-ply sheet S and the other end of the two-ply sheet S is opened largely.

In response to detection of the leading end of the two-ply sheet S with the sheet conveyance sensor C5, the two-ply sheet S is conveyed from the sheet conveyance sensor C5 by a designated amount to perform these operations.

Then, as illustrated in FIG. 10, the controller 550 of the sheet processing device 100 causes the entrance roller pair 108 to rotate to convey the inner sheet P conveyed from the sheet tray 103 (see FIG. 1) toward the exit roller pair 113 in the forward conveyance direction (i.e., the sheet conveyance direction A).

Subsequently, as illustrated in FIG. 11, the sheet processing device 100 rotates the exit roller pair 113 so that the two-ply sheet S and the inner sheet P meet to insert the inner sheet P into the two-ply sheet S from the open portion (on the other end) of the two-ply sheet S.

Then, as illustrated in FIG. 12A, the exit roller pair 113 of the sheet processing device 100 conveys the two-ply sheet S in which the inner sheet P is inserted, in the forward conveyance direction (i.e., the sheet conveyance direction A). Thus, the two sheets of the two-ply sheet S are overlapped one on another again so as to close the open portion of the two-ply sheet S. Then, a roller disposed downstream from the exit roller pair 113 ejects and stacks the two-ply sheet S with the inner sheet PM inserted (nipped), on the sheet ejection tray 104 (see FIG. 1).

As an alternative example, in a case in which a sheet processing device includes a heat-pressure device that can heat and press the two-ply sheet S, as illustrated in FIG. 12B, a branching claw 118 may change (switch) the sheet conveyance passage of the two-ply sheet S to convey the two-ply sheet S to the heat-pressure device.

As described above, the sheet processing device 100 causes the driver to largely open the two-ply sheet S so as to insert and nip the inner sheet P into the two-ply sheet S.

A description is given of a laminator, an image forming apparatus, and an image forming system, each including the sheet processing device according to an embodiment of the present disclosure.

Figure 13:
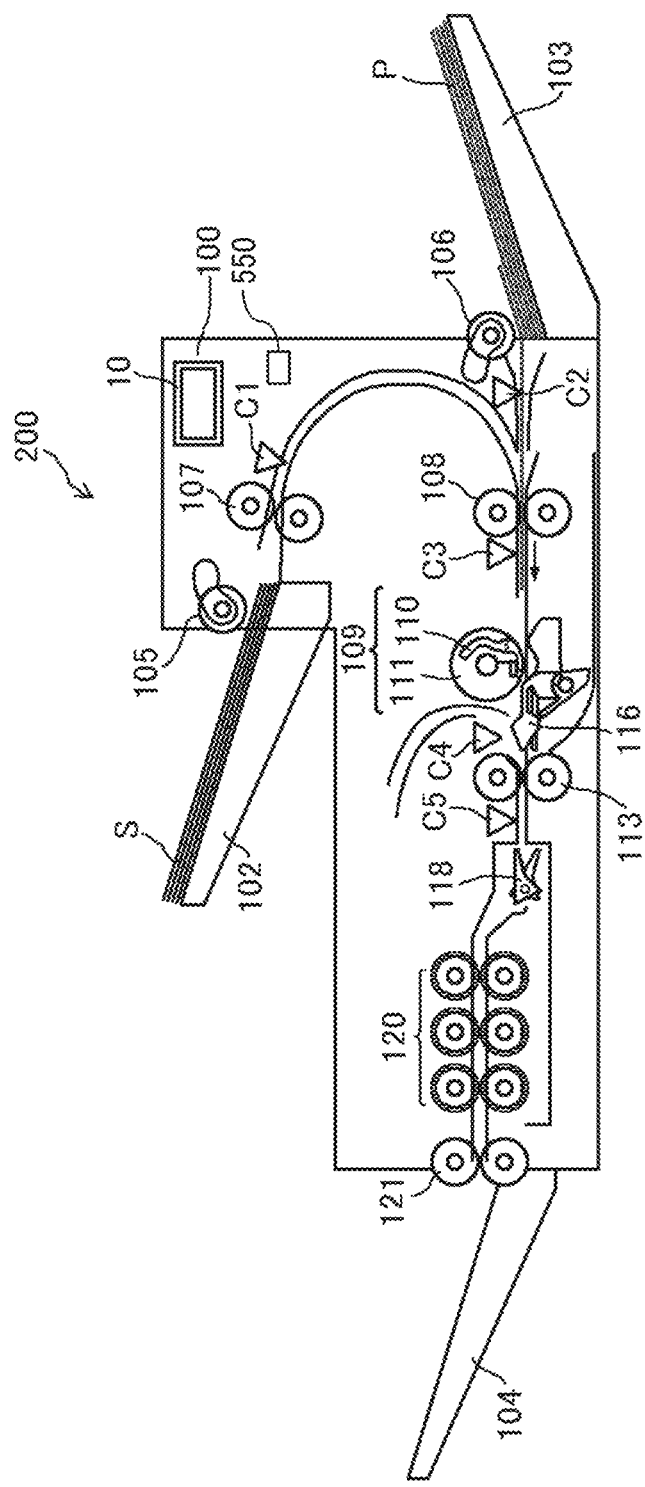
FIG. 13 is a schematic diagram illustrating an overall configuration of a sheet laminator according to an embodiment of the present disclosure, including the sheet processing device illustrated in FIG. 1.

FIG. 13 is a schematic diagram illustrating an overall configuration of a sheet laminator according to an embodiment of the present disclosure, including the sheet processing device illustrated in FIG. 1.

As illustrated in FIG. 13, a sheet laminator 200 includes the sheet processing device 100 described above, the branching claw 118, thermal pressure rollers 120, and a sheet ejection roller 121. The branching claw 118 changes (switches) the sheet conveyance passage of the two-ply sheet S. The thermal pressure rollers 120 that function as a heat-pressure member that can heat and press the two-ply sheet S. The sheet ejection roller 121 is disposed downstream from the thermal pressure rollers 120 in the sheet conveyance direction.

The sheet laminator 200 performs a series of operations, in this order, of feeding the two-ply sheet S, separating the two-ply sheet S, inserting the inner sheet P into the two-ply sheet S, and laminating the two-ply sheet S with the inner sheet P being inserted, by application of heat and pressure, on a stand-alone basis. This series of operations is carried out automatically without any aid of a user, and therefore the sheet laminator 200 enhances and provides the convenience better than a known sheet laminator employing a known technique.

Figure 14:
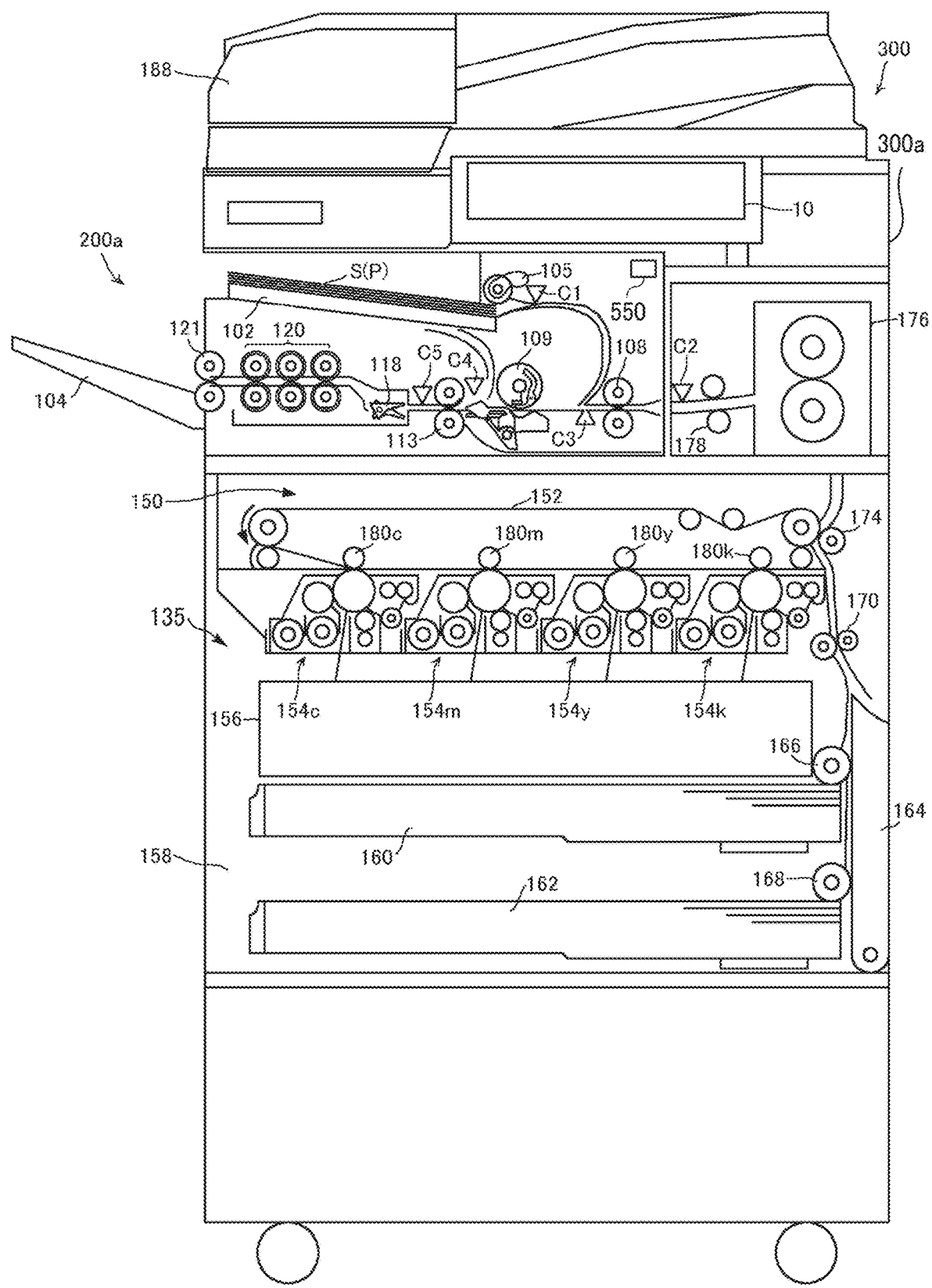
FIG. 14 is a schematic diagram illustrating an overall configuration of an image forming apparatus according to an embodiment of the present disclosure, including the sheet laminator illustrated in FIG. 13.

FIG. 14 is a schematic diagram illustrating the overall configuration of an example of an image forming apparatus according to an embodiment of the present disclosure, including the sheet laminator illustrated in FIG. 13.

An image forming apparatus 300 includes a sheet laminator 200a as a device that performs sheet lamination in the housing of the image forming apparatus 300. An operation panel 10 is provided on the exterior of the image forming apparatus 300. The operation panel functions as a display-operation device that displays information in the image forming apparatus 300 and receives input of the operation of the image forming apparatus 300. The operation panel 10 also functions as a notification device that issues a perceptual signal to the user.

The sheet laminator 200 includes the sheet tray 102 on which the two-ply sheet S or the inner sheet P are stacked. The sheet laminator 200 can receive the two-ply sheet S, the inner sheet PM, or both from the image forming apparatus 300. Accordingly, the image forming apparatus 300 (e.g., a printer and a copier) can add (form) an image on the two-ply sheet S or the inner sheet P by the in-line connection.

A detailed description is given of the configuration of the image forming apparatus 300, with reference to FIG. 14.

As illustrated in FIG. 14, an image forming apparatus 300 includes an image forming device 135 in the housing 300a. The image forming device 135 includes an intermediate transfer device 150. The intermediate transfer device 150 includes an intermediate transfer belt 152 having an endless loop and being entrained around a plurality of rollers and stretched substantially horizontally. The intermediate transfer belt 152 rotates in the counterclockwise direction in FIG. 14.

The image forming device 135 of the image forming apparatus 300 further includes image forming units 154c, 154m, 154y, and 154k for cyan (C), magenta (M), yellow (Y), and black (K), respectively. The image forming units 154c, 154m, 154y, and 154k are disposed below the intermediate transfer device 150 in the housing 300a. The image forming units 154c, 154m, 154y, and 154k are aligned in a quadruple tandem manner along an extended direction of the intermediate transfer belt 152. Each of the image forming units 154c, 154m, 154y, and 154k includes a drum-shaped image bearer that rotates in the clockwise direction in FIG. 14. Various image forming components, for example, a charging unit, a developing unit, a transfer unit, and a cleaning unit, are disposed around each of the image forming units 154c, 154m, 154y, and 154k. An exposure device 156 is disposed below the image forming units 154c, 154m, 154y, and 154k in the housing 300a of the image forming apparatus 300.

A sheet feeder 158 is disposed below the exposure device 156 in the housing 300a of the image forming apparatus 300. The sheet feeder 158 includes a first sheet tray 160 that stores two-ply sheets S and a second sheet tray 162 that stores inner sheets P. The first sheet tray 160 serves as a third sheet stacker on which a two-ply sheet such as the two-ply sheet S is stacked. Similarly, the second sheet tray 162 serves as a fourth sheet stacker on which a sheet medium (e.g., the inner sheet P) is loaded.

A first feed roller 166 is disposed at a position upper right of the first sheet tray 160. The first feed roller 166 feeds out the two-ply sheet S one by one from the first sheet tray 160 to a sheet conveyance passage 164. A second feed roller 168 is disposed at the upper right of the second sheet tray 162 and feeds the inner sheet PM from the second sheet tray 162 one by one to the sheet conveyance passage 164.

The sheet conveyance passage 164 extends upwardly from the lower side to the upper side on the right side in the housing 300a of the image forming apparatus 300 and communicates with the sheet laminator 200a inside the housing 300a of the image forming apparatus 300. The sheet conveyance passage 164 is provided with, e.g., a conveyance roller 170, a secondary transfer device 174 disposed facing the intermediate transfer belt 152, a fixing device 176, and a sheet ejection device 178 including an ejection roller pair, serially.

Each of the first feed roller 166, the conveyance roller 170, and the sheet conveyance passage 164 serves as a third sheet feeder to feed the two-ply sheet from the first sheet tray 160 (third sheet stacker).

Each of the second feed roller 168, the conveyance roller 170, and the sheet conveyance passage 164 serves as a fourth sheet feeder to feed a sheet medium from the second sheet tray 162 (fourth sheet stacker). Further, the intermediate transfer device 150 and the fixing device 176 serve as a part of the image forming device 135 that forms an image on a two-ply sheet or a sheet medium.

A description is given of operations of the image forming apparatus 300 according to the present embodiment, to form an image on the two-ply sheet S and then perform a sheet laminating operation on the two-ply sheet S.

To perform an image on the two-ply sheet S, first, an image reading device 188 reads the image on an original document, and the exposure device 156 then performs writing of the image on the original document. The image forming units 154c, 154m, 154y, and 154k form respective toner images of cyan (C), magenta (M), yellow (Y), and black (K), respectively, on the respective image bearers. Then, primary transfer devices 180c, 180m, 180y, and 180k sequentially transfer the respective toner images onto the intermediate transfer belt 152, thereby forming a color image on the intermediate transfer belt 152.

By contrast, the image forming apparatus 300 rotates the first feed roller 166 to feed and convey the two-ply sheet S to the sheet conveyance passage 164. The two-ply sheet S is conveyed by the conveyance roller 170 through the sheet conveyance passage 164 and is sent to a secondary transfer position in synchrony with movement of the color image on the intermediate transfer belt 152. Then, the secondary transfer device 174 transfers the color image formed on the intermediate transfer belt 152 as described above, onto the two-ply sheet S.

After the color image has been transferred onto the two-ply sheet S, the fixing device 176 fixes the color image to the two-ply sheet S, and the sheet ejection device 178 ejects to convey the two-ply sheet S to the sheet laminator 200a.

Further, the image forming apparatus 300 rotates the second feed roller 168 to feed the inner sheet P to the sheet conveyance passage 164, and the sheet ejection device 178 ejects to convey the inner sheet P to the sheet laminator 200a.

As described above, the two-ply sheet S on which the image has been formed and the inner sheet P are conveyed to the sheet laminator 200a, so that the sheet laminating operation is performed by the sheet laminator 200a. The details of the sheet laminating operation have been described above and the redundant descriptions are omitted.

According to the above-described configuration of the image forming apparatus 300 according to the present embodiment, the sheet laminator 200a can also perform the sheet laminating operation after an image is formed on the inner sheet P. The sheet laminator 200a may also perform the sheet laminating operation after images are formed on the inner sheet P and the two-ply sheet S.

Figure 15:
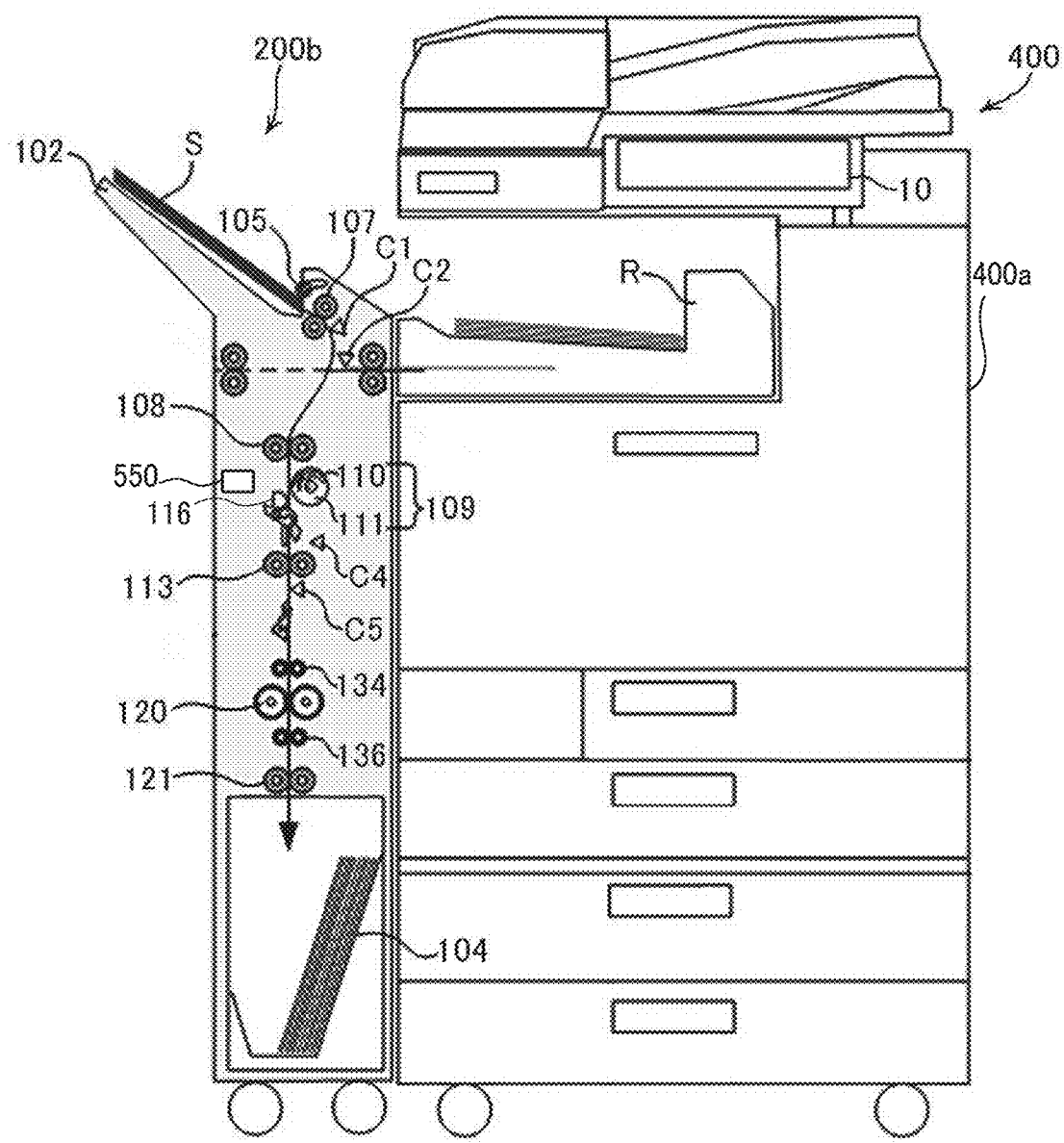
FIG. 15 is a schematic diagram illustrating an overall configuration of an image forming apparatus according to an embodiment of the present disclosure, including a sheet laminator on the outside of the housing.

FIG. 15 is a schematic diagram illustrating an overall configuration of an image forming apparatus according to an embodiment of the present disclosure, including a sheet laminator on the outside of the housing.

Figure 16:
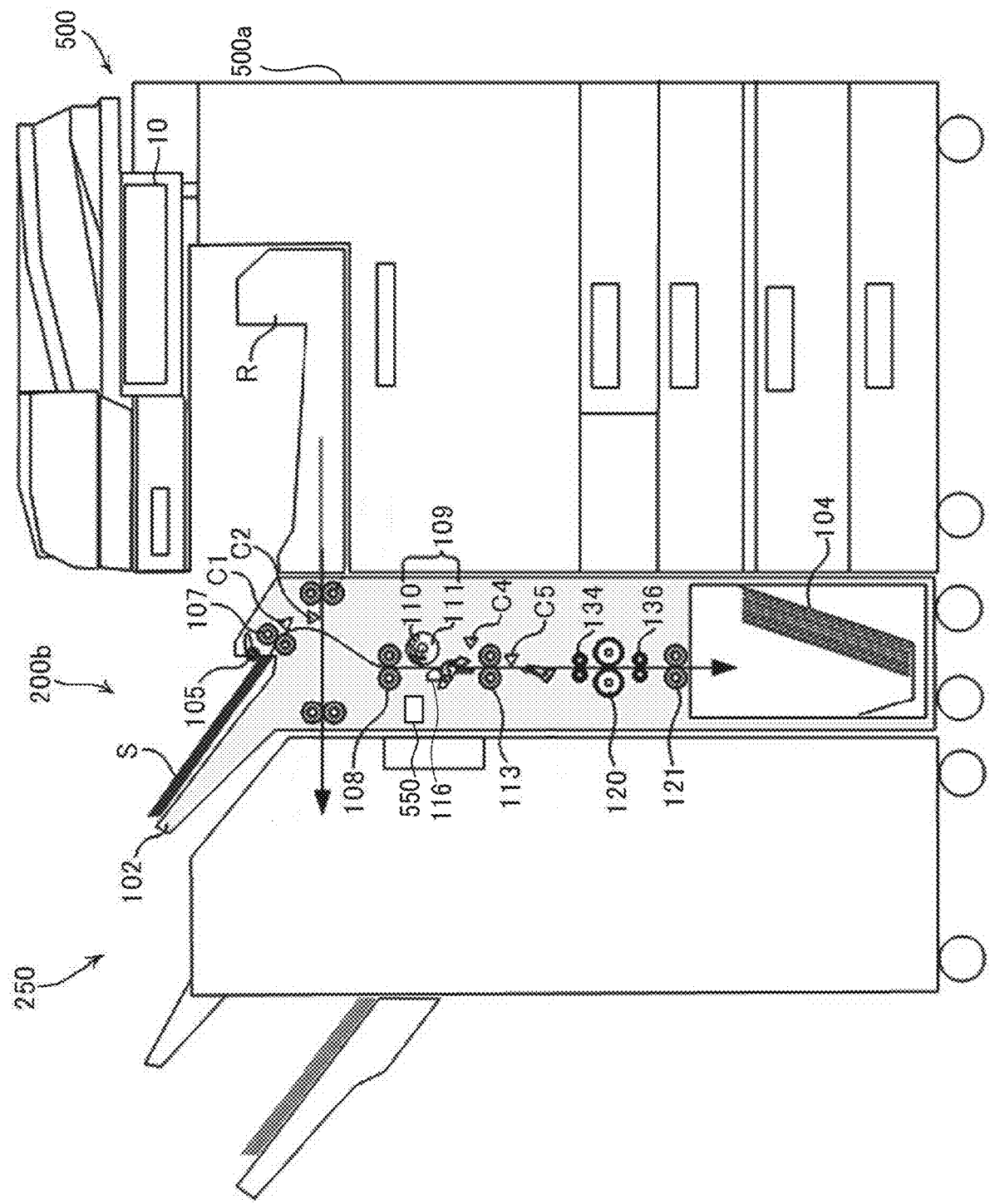
FIG. 16 is a schematic diagram illustrating an overall configuration of an image forming apparatus according to an embodiment of the present disclosure, including a sheet laminator on the outside of the housing, different from FIG. 15.

FIG. 16 is a schematic diagram illustrating an overall configuration of an image forming apparatus according to an embodiment of the present disclosure, including a sheet laminator on the outside of the housing, different from FIG. 15.

In FIGS. 15 and 16, elements identical to the elements illustrated in FIGS. 13 and 14 are given identical reference numerals, and the descriptions these elements are omitted.

An image forming apparatus 400 illustrated in FIG. 15 is basically same as the image forming apparatus 300 illustrated in FIG. 14. However, different from the image forming apparatus 300 illustrated in FIG. 14, the image forming apparatus 400 illustrated in FIG. 15 includes a sheet laminator 200b on the outside of the housing 400a of the image forming apparatus 400.

The sheet laminator 200b conveys the two-ply sheet (two-ply sheet S) in the vertical direction and perform the sheet laminating operation. The sheet laminator 200b includes the sheet tray 102 on which the two-ply sheets S are stacked. The sheet laminator 200b can receive the two-ply sheets S, and the inner sheets P form the image forming apparatus 400 via a relay device R. Accordingly, a printer or a copier (e.g., the image forming apparatus 400) can add (form) an image on the inner sheet P by the in-line connection.

A two-ply sheet S into which an inner sheet P has been inserted is ejected and stacked on the sheet ejection tray 104 by an exit roller pair 113 or rollers disposed downstream from the exit roller pair 113 in the conveyance direction of the two-ply sheet S. The rollers disposed downstream from the exit roller pair 113 include conveyance roller pairs 134 and 136 as illustrated in FIGS. 15 and 16. The sheet ejection tray 104 is disposed inside a housing of the sheet laminator 200b. Such a configuration facilitates a vertical conveyance of the two-ply sheet S toward the sheet ejection tray 104.

Specifically, the two-ply sheet S in which the inner sheet P has been sandwiched between the two sheets of the two-ply sheet S is conveyed to a fixing device having thermal pressure rollers 120 by the exit roller pair 113 or the rollers (e.g., the conveyance roller pairs 134 and 136) disposed downstream from the exit roller pair 113 in the conveyance direction of the two-ply sheet S.

When passing through the thermal pressure rollers 120, the two-ply sheet S is thermally pressed and fixed. After passing through the thermal pressure rollers 120, the two-ply sheet S continues to be conveyed vertically downward toward the sheet ejection tray 104 and is stacked on the sheet ejection tray 104.

Since the two-ply sheet S pressed after passing through the thermal pressure rollers 120 is ejected vertically downward in this manner, the two-ply sheet S can be stacked on the sheet ejection tray 104 while preventing the heated two-ply sheet S from being bent by an external force.

The image forming apparatus 500 in FIG. 16 has a configuration in which another post-processing apparatus 250 is disposed further downstream from the sheet laminator 200b in the conveyance direction of the two-ply sheet S. This post-processing apparatus includes, for example, a sheet feeding apparatus (stacker) and a case bookbinding apparatus. According to the request of the user, the job performing the sheet laminating operation and the job not performing the sheet laminating operation can be performed in parallel, which enhances the working efficiency.

A description is given of a configuration in which, when multiple feeding of a lamination sheet (two-ply sheet S) occurs, the multi-fed lamination sheet is retracted to a sheet conveyance passage (e.g., the purge tray) different from the normal sheet conveyance passage.

First Embodiment

Figure 17:
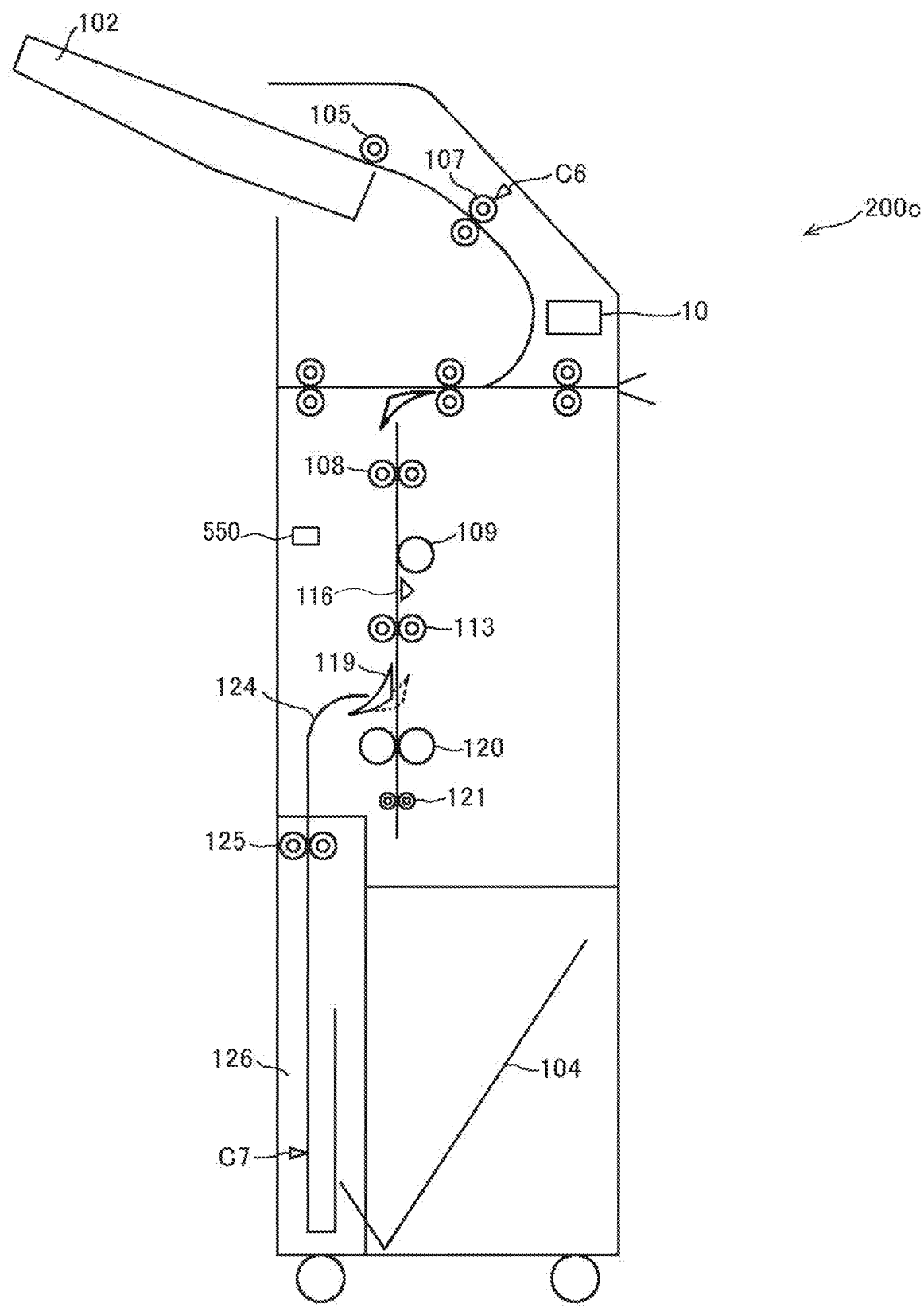
FIG. 17 is a schematic diagram illustrating an overall configuration of a sheet laminator according to an embodiment of the present disclosure.

A description is given of a sheet processing device according to an embodiment of the present disclosure, with reference to FIG. 17.

FIG. 17 is a schematic diagram illustrating an overall configuration of a sheet laminator according to an embodiment of the present disclosure.

In FIG. 17, the same components as those in FIGS. 1 to 16 are denoted by the same reference numerals, and detailed description thereof will be omitted.

As illustrated in FIG. 17, the sheet laminator 200c includes the multi-feeding detection sensor C6 to detect multiple feeding of the two-ply sheet S. The multi-feeding detection sensor C6 is disposed downstream from a sheet feeder to feed a two-ply sheet S in the conveyance direction of the two-ply sheet S and near the conveyance roller pair 107. The sheet feeder may be, for example, the sheet tray 102 or the pickup roller 105. The multi-feeding detection sensor C6 serves as a multi-feeding detector such as an ultrasonic sensor and a displacement sensor.

The sheet laminator 200c further includes a sheet processing device to separate the two-ply sheet S to insert the inner sheet P in the two-ply sheet S. The sheet processing device is disposed downstream from the multi-feeding detection sensor C6 in the conveyance direction of the two-ply sheet S. The sheet processing device may be, for example, the entrance roller pair 108, the winding roller 109, or the exit roller pair 113. The sheet laminator 200c further includes the thermal pressure rollers 120 and the sheet ejection tray 104 that were disposed downstream from the sheet processing device in the conveyance direction of the two-ply sheet S. The sheet ejection tray 104 serves as a sheet stacker to stack the two-ply sheet S that has passed through the thermal pressure rollers 120.

The configurations and functions of the sheet processing device and the fixing device such as the thermal pressure rollers 120 have already been described in the descriptions of the sheet processing device 100 and the sheet laminator 200, the redundant descriptions are summarized or omitted accordingly.

The sheet laminator 200c further includes a purge tray 126 and a passage switcher 119. The purge tray 126 is disposed different from the sheet ejection tray 104 and includes a retracted sheet conveyance passage 124 that is branched at a point upstream from the thermal pressure rollers 120 in the conveyance direction of the two-ply sheet S. The passage switcher 119 switches the sheet conveyance passages of the two-ply sheet S. The sheet laminator 200c further includes a conveyance roller pair 125 between the retracted sheet conveyance passage 124 and the purge tray 126.

The purge tray 126 has a capacity that can store a plurality of sheets S (for example, sheets), and is provided with a sheet detection sensor C7 that detects the two-ply sheet S, specifically, detects whether the two-ply sheet S is in the purge tray 126. The purge tray 126 serves as a purging portion, and the sheet detection sensor C7 serves as a sheet detector. The sheet detector may be, for example, a laser displacement sensor.

It is preferable that the sheet detection sensor C7 can detect the two-ply sheet S in the purge tray 126 regardless of the control of the image forming apparatus (including the reboot or the power off and on of the image forming apparatus).

The passage switcher 119 is disposed upstream from the thermal pressure rollers 120 and the retracted sheet conveyance passage 124 in the conveyance direction of the two-ply sheet S to switch the sheet conveyance passage of the two-ply sheet S conveyed from the sheet processing device to the thermal pressure rollers 120 or to the retracted sheet conveyance passage 124 (i.e., the purge tray 126).

When the multiple feeding of the two-ply sheet S is detected in the sheet laminating operation, the sheet laminator 200c according to the present embodiment conveys (purges) the multi-fed two-ply sheet S to the purge tray 126 (purging operation) and conveys a different two-ply sheet S for retrying the sheet laminating operation on the different two-ply sheet S.

Further, when the multiple feeding of the two-ply sheet S is detected in the sheet laminating operation, the sheet laminator 200c according to the present embodiment can stop conveyance of the two-ply sheet S (i.e., the conveyance stopping operation).

When the multiple feeding of the two-ply sheet S is detected, the sheet laminator 200c performs the purging operation (and retries the sheet laminating operation) or the conveyance stopping operation of the multi-fed two-ply sheet S. Whether the sheet laminator 200c performs the purging operation or the conveyance stopping operation can be set by the user in advance. The setting can be made by the user via the operation panel 10 disposed on the exterior of the sheet laminator 200c.

Figure 18:
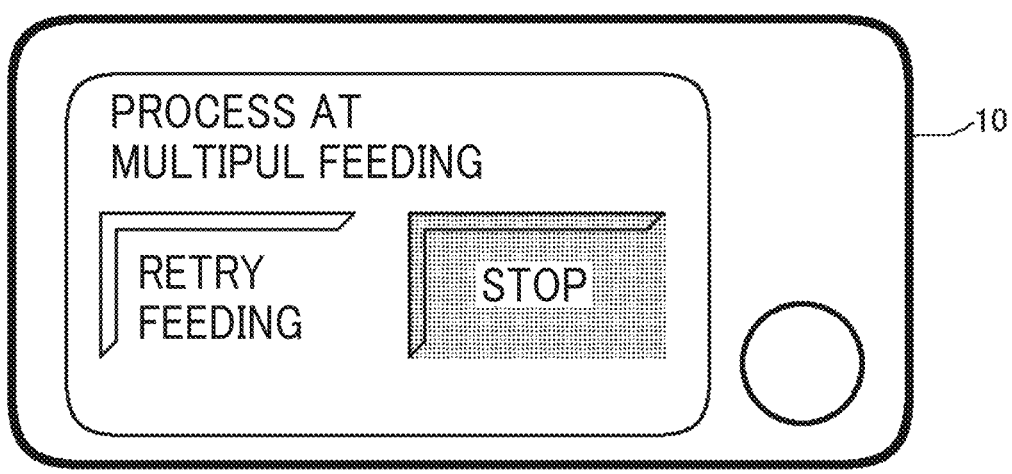
FIG. 18 is a schematic view of an operation screen displayed on a control panel for setting processing at the time of multiple feeding.

FIG. 18 is a schematic view of another operation screen displayed on the operation panel for setting processing at the time of multiple feeding.

When the "RETRY FEEDING" button is selected, the sheet laminator 200c performs the purging operation (and retries the sheet laminating operation) in response to the detection of multiple feeding of the two-ply sheet S. On the other hand, when the "STOP" button is selected, the sheet laminator 200c stops the conveyance of the two-ply sheet S in response to the detection of multiple feeding of the two-ply sheet S.

The process setting ("RETRY FEEDING" or "STOP") at the time of multiple feeding of the two-ply sheet S is transmitted to the controller 550 for sheet processing of the sheet laminator 200c and referred to, accordingly.

Figure 19:
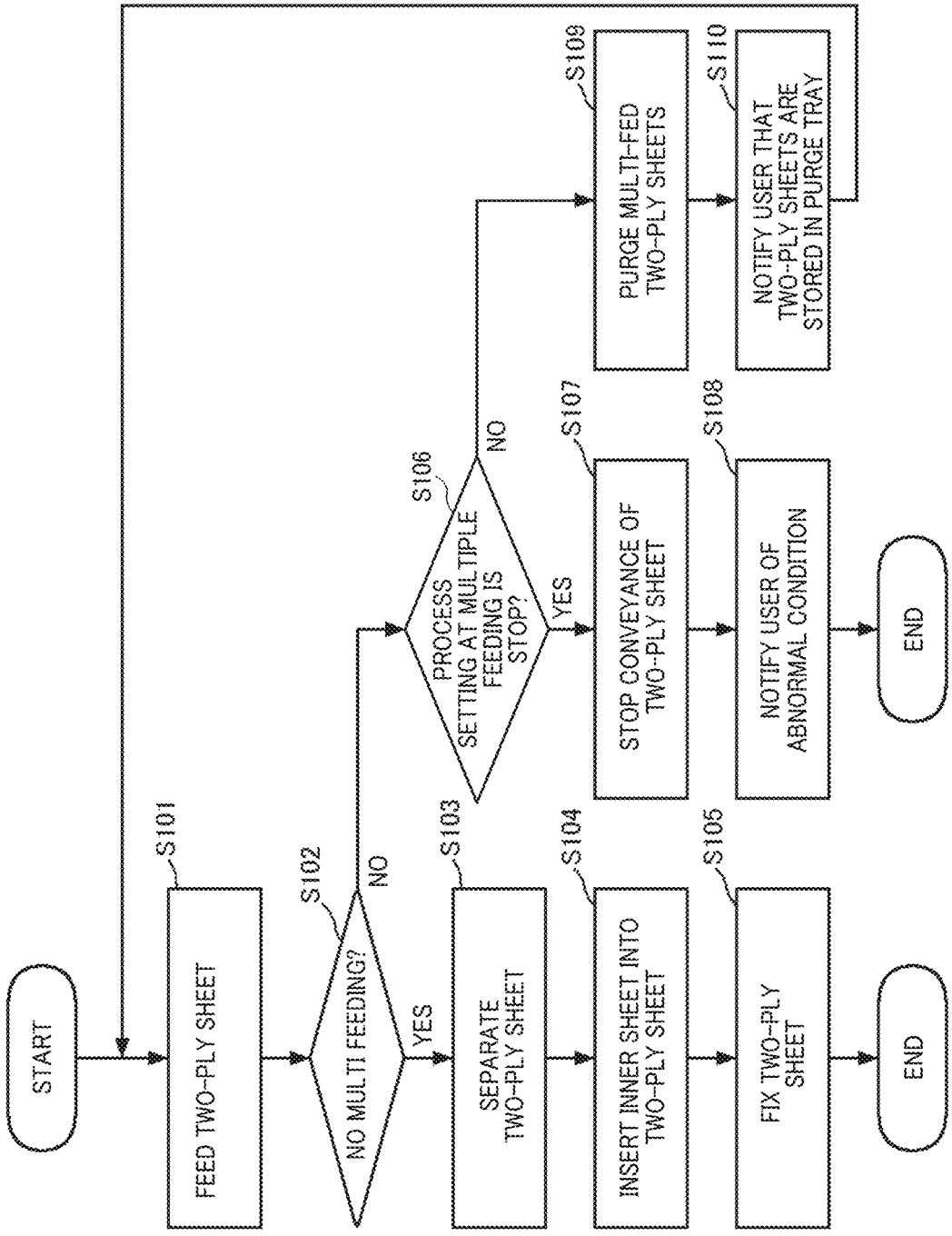
FIG. 19 is a flowchart of a series of operations performed by the sheet laminator in accordance with whether multiple feeding of sheets has occurred.

FIG. 19 is a flowchart of a series of operations performed by the sheet laminator in accordance with whether multiple feeding of sheets has occurred.

A description is given of the series of operations performed in the sheet laminator, with reference to FIGS. 17 and 18 and the flowchart of FIG. 19.

In a step S101, the controller 550 causes the sheet laminator 200c to feed the two-ply sheet S from the sheet feeder (i.e., the sheet feeding operation). Then, in step S102, the controller 550 determines whether no multiple feeding of the two-ply sheet S occurs at the multi-feeding detection sensor C6.

When it is determined that no multiple feeding of the two-ply sheet S occurs at the multi-feeding detection sensor C6 (YES in step S102), the controller 550 causes the sheet laminator 200c to separate the two-ply sheet S (i.e., the sheet separating operation in the sheet processing device) in step S103, and then insert the inner sheet P into the two-ply sheet S in step S104. At this time, the passage switcher 119 is at the position to convey the two-ply sheet S toward the thermal pressure rollers 120. In step S105, the controller 550 causes the thermal pressure rollers 120 to fix the two-ply sheet S and the sheet ejection roller 121 to eject the two-ply sheet S to stack in the sheet ejection tray 104.

On the other hand, when it is determined that the multiple feeding of the two-ply sheet S occurs at the multi-feeding detection sensor C6 (NO in step S102), the controller 550 causes the sheet laminator 200c to refer to the process setting at the time of multiple feeding to determine whether the process setting is "STOP" in a step S106 (see FIG. 18). When the sheet laminator 200c refers to the process setting and the process setting at multiple feeding is "STOP" (YES in step S106), the controller 550 causes conveyance of the multi-fed two-ply sheet S to stop promptly in step S107. Then, in step S108, the controller 550 causes the operation panel 10 to notify the user of an abnormal condition that multiple feeding of the two-ply sheet S has occurred.

The user who has become aware of the notification from the operation panel 10 (of the sheet laminator 200c) can take out the multi-fed sheet S from the inside of the apparatus in which the conveyance is stopped.

On the other hand, when the sheet laminator 200c refers to the process setting and the process setting at multiple feeding is "RETRY FEEDING" (NO in step S106), the controller 550 causes the sheet laminator 200c to purge the multi-fed two-ply sheet S (i.e., the purging operation) in step S109. Specifically, the controller 550 causes the sheet processing device of the sheet laminator 200c to convey the multi-fed two-ply sheet S downward in the conveyance direction of the two-ply sheet S without separating the two-ply sheet S and inserting the inner sheet P. At this time, the passage switcher 119 is switched to the position to convey the two-ply sheet S toward the retracted sheet conveyance passage 124, so that the multi-fed two-ply sheet S is conveyed to the purge tray 126 via the conveyance roller pair 125.

In a step S110, the two-ply sheet S conveyed to the purge tray 126 is detected by the sheet detection sensor C7. The sheet laminator 200c notifies the user on the operation panel that the multi-fed two-ply sheets S are stored in the purge tray 126.

The operation panel 10 also serves as a notification device that issues a perceptual signal to the user and may notify the user of abnormality by, for example, sound or light.

The notification indicating that the two-ply sheet S is stored in the purge tray 126 may be made at the time when the purging operation of the two-ply sheet S is started, may be made after the entire sheet laminating operation is completed, or may be made at the time when the subsequent sheet laminating operation is started.

Back in step S101, the controller 550 causes the sheet laminator 200c to feed a new two-ply sheet S from the sheet feeder to retry the sheet laminating operation.

The sheet laminator 200c according to the present embodiment performs, as a series of operations, the sheet feeding operation of feeding the sheet S and the inner sheet P, the sheet separating operation of separating the two-ply sheet S, the sheet inserting operation of inserting the inner sheet P into the separated two-ply sheet S, the fixing operation of heating and pressing the two-ply sheet S in which the inner sheet P is inserted, and the sheet ejecting operation of ejecting the fixed two-ply sheet S to the sheet ejection portion. As a result, this configuration enhances the convenience for users.

When the multiple feeding of the two-ply sheets S is detected, the sheet processing operation and the fixing operation are not performed on the multi-fed two-ply sheets S, and the sheet laminator 200c can retry sheet feeding, that is, the sheet feeding operation of another new two-ply sheet S while the multi-fed two-ply sheets S are stored in the purge tray 126. As a result, the multi-fed two-ply sheets S can be maintained to be reusable, and the sheet laminator 200c can continue the sheet laminating operation without irregular stop.

Modification of First Embodiment

The sheet laminator according to a modification of the first embodiment of the present disclosure may include a sheet ejection unit, instead of the sheet ejection tray 104, to eject the fixed two-ply sheet S to the outside of the sheet laminator. Removal of the sheet ejection tray 104 can reduce the size of the sheet laminator.

Second Embodiment

The sheet laminator 200c according to the second embodiment of the present disclosure is different from the sheet laminator 200c according to the first embodiment of the present disclosure. Specifically, the sheet laminator 200c according to the second embodiment of the present disclosure has a function to change whether to perform the purging operation on the multi-fed two-ply sheets S (first multi-feeding processing mode) or the conveyance stopping operation (second multi-feeding processing mode). The number of multi-fed two-ply sheets S, in other words, the thickness of the multi-fed two-ply sheets S can be detected by a multi-feeding detection sensor C6.

The threshold value for changing between the purging operation of the two-ply sheets S (first multi-feeding processing mode) and the conveyance stopping operation (second multi-feeding processing mode) can be set in advance by the user using, for example, the operation panel 10.

Figure 20:
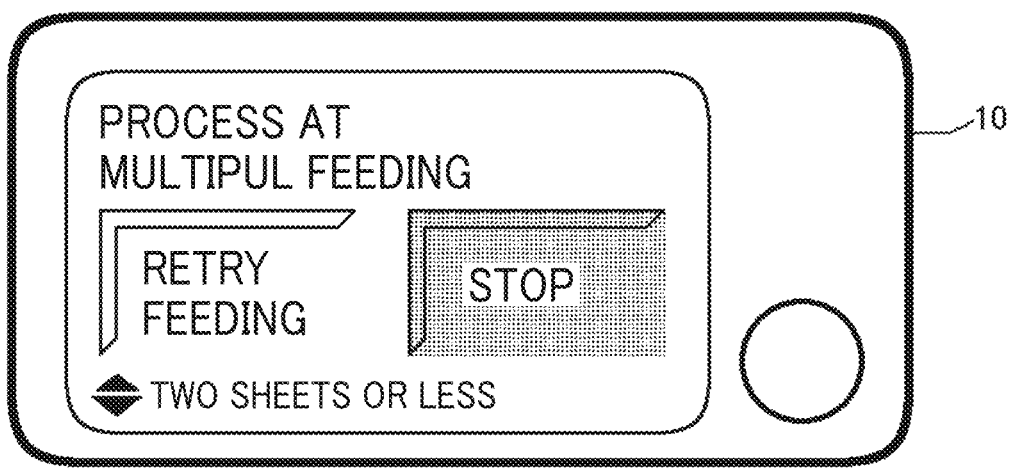
FIG. 20 is a schematic view of another operation screen displayed on the control panel for setting processing at the time of multiple feeding.

FIG. 20 is a schematic view of another operation screen displayed on the operation panel for setting the operation at the time of multiple feeding.

When the threshold value of the number of multi-fed two-ply sheets is selected together with the "RETRY FEEDING" button ("TWO SHEETS OR LESS" is selected in FIG. 20, the sheet laminator 200c performs the purging operation when the number of multi-fed two-ply sheets S is two or less or performs the conveyance stopping operation when the number of multi-fed two-ply sheets S is three or more.

When the "STOP" button is selected, the sheet laminator 200c temporarily stops conveyance of the two-ply sheet S in response to the detection of multiple feeding of the two-ply sheets S.

Figure 21:
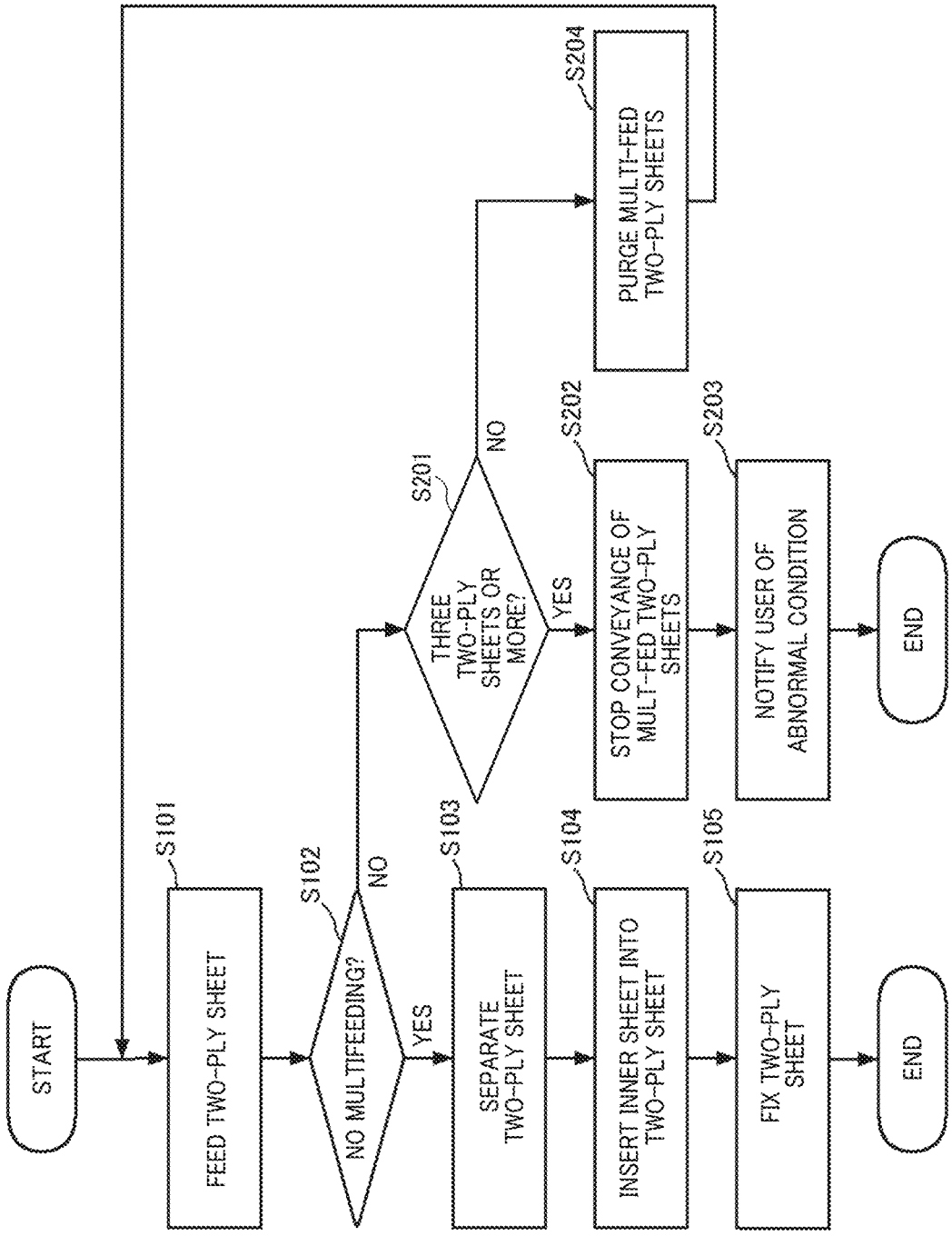
FIG. 21 is a flowchart of a series of operations performed by the sheet laminator in accordance with whether multiple feeding of sheets has occurred and the predetermined number of sheets of multiple feeding.

FIG. 21 is a flowchart of a series of operations performed by the sheet laminator in accordance with whether multiple feeding of sheets has occurred and the predetermined number of sheets of multiple feeding.

A description is given of the series of operations, with reference to FIGS. 17 and 20 and the flowchart of FIG. 21.

Since steps S101 to 105 in the second embodiment are the same as steps S101 to 105 in the first embodiment, the following description is made from step S201. In step S201, the controller 550 of the sheet laminator 200c compares the thickness of the two-ply sheets S detected by the multi-feeding detection sensor C6 and the thickness of the predetermined number of two-ply sheets S (in this case, the thickness of two two-ply sheets S), and determines whether the number of multi-fed two-ply sheets S is three or more based on the detection result of the multi-feeding detection sensor C6.

When it is determined that the number of multi-fed two-ply sheets S is three or more (YES in step S201), the controller 550 stops conveyance of the multi-fed two-ply sheets S promptly, in step S202. Then, the controller 550 notifies the user of abnormal condition that the multiple feeding of two-ply sheets has occurred, via the operation panel 10, in step S203, the operation panel 10 is used to inform the user of an abnormal condition.

On the other hand, when it is determined that the number of multi-fed two-ply sheets S is two or less (NO in step S201), the controller 550 causes the sheet laminator 200c to purge the multi-fed two-ply sheet S in step S204. Specifically, the controller 550 causes the sheet processing device of the sheet laminator 200c to convey the multi-fed two-ply sheet S downward in the conveyance direction of the two-ply sheet S without separating the two-ply sheet S and inserting the inner sheet P. At this time, the passage switcher 119 is switched to the position to convey the two-ply sheet S toward the retracted sheet conveyance passage 124, so that the multi-fed two-ply sheet S is conveyed to the purge tray 126 via the conveyance roller pair 125.

Back in step S101, the controller 550 causes the sheet laminator 200c to feed a new two-ply sheet S from the sheet feeder to retry the sheet laminating operation.

As described above, when the multi-feeding of the two-ply sheets S is detected, the sheet laminator 200c according to the present embodiment can change whether to perform the purging operation (first multi-feeding processing mode) or the conveyance stopping operation (second multi-feeding processing mode) depending on a given number of multi-fed two-ply sheets S. In other words, the controller 550 changes whether to stop the conveyance of the two-ply sheet S or to convey the two-ply sheet S to the purge tray 126 and retry the sheet feeding with another two-ply sheet S, depending on a given number of multi-fed two-ply sheets S.

Further, the number of multi-fed two-ply sheets can be set optionally by the user. For this reason, the sheet laminator can perform the operation according to the specifications. For example, the sheet laminator retries the purging operation and the sheet laminating operation when multiple feeding of two two-ply sheets S occurs, in other words, most frequent multiple feeding, occurs. The sheet laminator performs the conveyance stopping operation when multiple feeding of three or more two-ply sheets S occurs, which is likely to cause damage on the two-ply sheet S or the sheet laminator when three or more multi-fed two-ply sheets S are fed to downstream in the conveyance direction of the two-ply sheet S.

Third Embodiment

The sheet laminator 200c according to the third embodiment of the present disclosure includes a counter that counts the number of detections of multiple feeding of the two-ply sheets S. When the counter sequentially counts a given number of detections, the controller 550 interrupts the sheet laminating operation to notify the user of this condition.

The counter is, for example, software implemented in the controller 550 of the sheet laminator 200c and detects the number of detections of multiple feeding of the two-ply sheets S detected by the multi-feeding detection sensor C6. For example, when the counter sequentially counts the given number or more of detections of multiple feeding of the two-ply sheets S (for example, four or more), in other words, the number of detections of multiple feeding of the two-ply sheets S is equal to or greater than the given number of detections of multiple feeding of the two-ply sheets S, the controller 550 causes the sheet laminator 200c to perform the conveyance stopping operation of the two-ply sheets S.

It is preferable that the given number of detections can be set in advance by the user using, for example, the operation panel 10.

Figure 22:
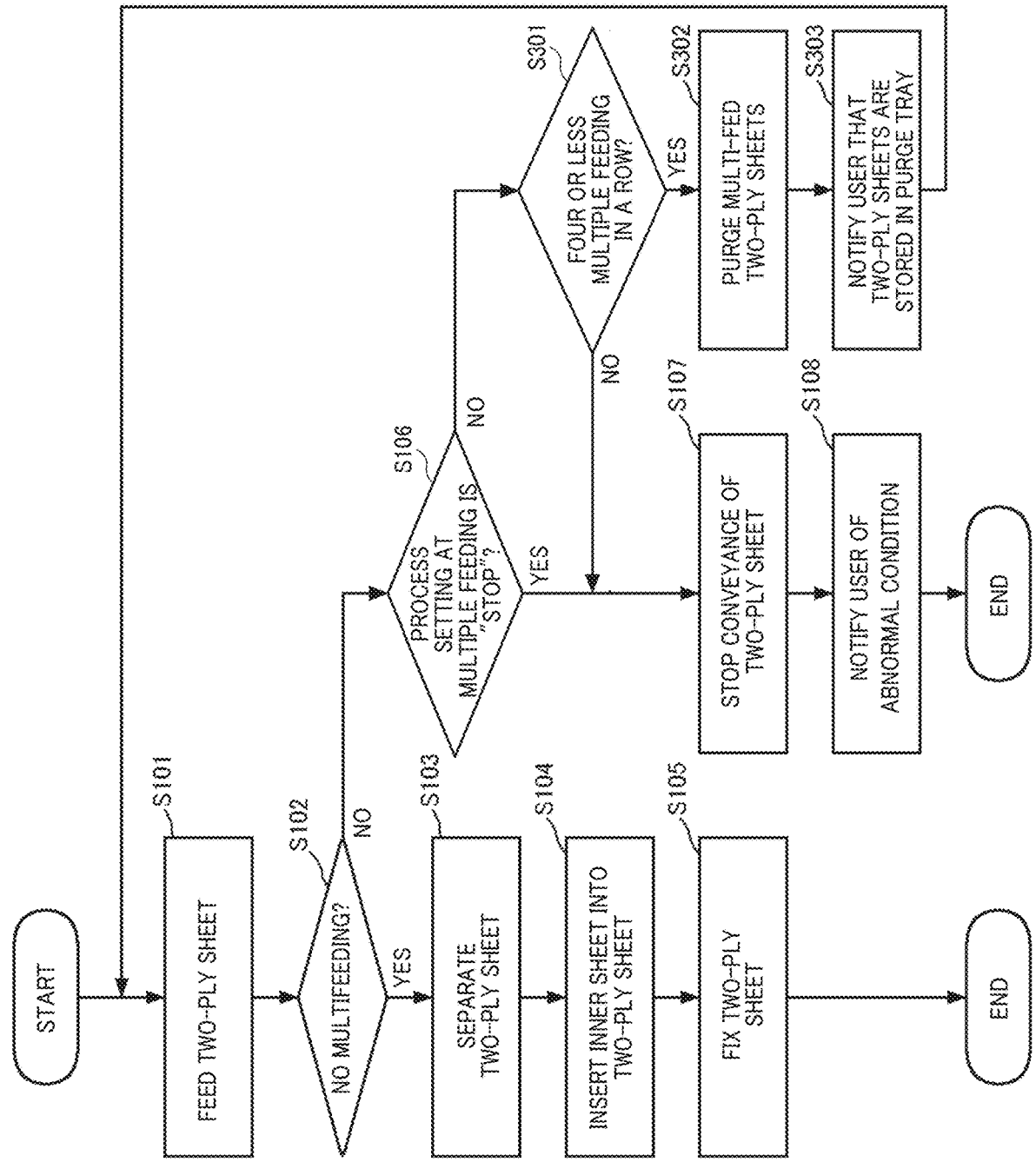
FIG. 22 is a flowchart of a series of operations performed by the sheet laminator in accordance with whether multiple feeding of sheets has occurred and the number of detections of multiple feeding.

FIG. 22 is a flowchart of a series of operations performed by the sheet laminator in accordance with whether multiple feeding of sheets has occurred and the number of detections of multiple feeding.

A description is given of the series of operations, with reference to FIG. 17 and the flowchart of FIG. 22.

Since steps S101 to 108 in the third embodiment are the same as steps S101 to 108 in the first embodiment, the following description is made from step S301. In step S301, the controller 550 of the sheet laminator 200c determines whether the number of detections of multiple feeding of the two-ply sheets S detected by the multi-feeding detection sensor C6 is four or less in a row.

When it is determined that the number of detections of multiple feeding of the two-ply sheets S detected by the multi-feeding detection sensor C6 is four or less (YES in step S301), the controller 550 causes the sheet laminator 200c to purge the multi-fed two-ply sheets S in step S302. Specifically, the controller 550 causes the sheet processing device of the sheet laminator 200c to convey the multi-fed two-ply sheet S downward in the conveyance direction of the two-ply sheet S without separating the two-ply sheet S and inserting the inner sheet P. At this time, the passage switcher 119 is switched to the position to convey the two-ply sheet S toward the retracted sheet conveyance passage 124, so that the multi-fed two-ply sheet S is conveyed to the purge tray 126 via the conveyance roller pair 125.

Then, in step S303, the two-ply sheet S conveyed to the purge tray 126 is detected by the sheet detection sensor C7. The sheet laminator 200c notifies the user on the operation panel 10 that the multi-fed two-ply sheets S are stored in the purge tray 126.

Back in step S101, the controller 550 causes the sheet laminator 200c to feed a new two-ply sheet S from the sheet feeder to retry the sheet laminating operation.

On the other hand, when it is determined that the number of detections of multiple feeding of the two-ply sheets S detected by the multi-feeding detection sensor C6 is five or more (NO in step S301), the procedure moves to step S107 to stop conveyance of the multi-fed two-ply sheets S promptly. Then, in step S108, the controller 550 causes the operation panel 10 to notify the user of an abnormal condition that multiple feeding of the two-ply sheet S has occurred.

Further, when the given number of detections of multiple feeding of the two-ply sheets S consecutively occurs, the sheet laminator 200c according to the present embodiment interrupts the sheet laminating operation to notify the abnormal condition of the sheet laminator 200c. When multiple feeding of the two-ply sheets S occurs beyond the predetermined number, it is likely that any failure occurs to the two-ply sheet S, the sheet laminator 200c, or both. The sheet laminator 200c according to the present embodiment can remind the user of the failure at the early stage of the situation.

Modification of Third Embodiment

The multiple feeding of the two-ply sheets S may occur discontinuously, in other words, normal conveyance and multiple feeding of the two-ply sheets S may occur alternately. For this reason, the sheet laminator may interrupt the sheet laminating operation when the number of detections of multiple feeding of the two-ply sheets S counted by the counter reaches the given cumulative number of detections (for example, 10 times) or more, and may notify the user of the abnormality.

It is preferable that the given cumulative number can be set in advance by the user using, for example, the operation panel 10.

Some embodiments of the present disclosure have been described in detail above. The above-described embodiments are examples and can be modified within the scope not departing from the gist of the present disclosure. For example, some embodiments and advantageous configurations may be combined with each other.

The present disclosure is not limited to specific embodiments described above, and numerous additional modifications and variations are possible in light of the teachings within the technical scope of the appended claims. It is therefore to be understood that, the disclosure of this patent specification may be practiced otherwise than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

The effects described in the embodiments of this disclosure are listed as the examples of preferable effects derived from this disclosure, and therefore are not intended to limit to the embodiments of this disclosure.

The embodiments described above are presented as an example to implement this disclosure. The embodiments described above are not intended to limit the scope of the invention. These novel embodiments can be implemented in various other forms, and various omissions, replacements, or changes can be made without departing from the gist of the invention. These embodiments and their variations are included in the scope and gist of this disclosure and are included in the scope of the invention recited in the claims and its equivalent.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A sheet laminator configured to laminate a two-ply sheet in which two sheets are overlapped and bonded together at one end of the two-ply sheet and a sheet-shaped medium inserted between the two sheets of the two-ply sheet, the sheet laminator comprising:
   a sheet feeder configured to feed the two-ply sheet;
   a multi-feeding detector disposed downstream from the sheet feeder in a conveyance direction in which the two-ply sheet is conveyed, the multi-feeding detector being configured to detect multiple feeding of the two-ply sheet;
   a fixing device disposed downstream from the multi-feeding detector in the conveyance direction, the fixing device being configured to fix the two-ply sheet by application of heat and pressure;
   an ejection device disposed downstream from the fixing device in the conveyance direction, the ejection device being configured to eject the two-ply sheet that has been fixed by the fixing device;
   a purging portion disposed at a position different from the ejection device, the purging portion including a retracted sheet conveyance passage branched at a point upstream from the fixing device in the conveyance direction;
   a passage switcher disposed upstream from the fixing device and the purging portion in the conveyance direction, the passage switcher being configured to switch a conveyance passage of the two-ply sheet to the fixing device or to the purging portion; and
   circuitry configured to, in response to detection of multiple feeding of the two-ply sheet, convey the two-ply sheet to the purging portion and retry sheet feeding with another two-ply sheet.

2. The sheet laminator according to claim 1,
   wherein the circuitry is configured to, in response to the detection of the multiple feeding of the two-ply sheet, select an operation of stopping conveyance of the two-ply sheet or an operation of conveying the two-ply sheet to the purging portion and retrying the sheet feeding with said another two-ply sheet.

3. The sheet laminator according to claim 1,
   wherein the circuitry is configured to, in response to the detection of the multiple feeding of the two-ply sheet, change whether to stop conveyance of the two-ply sheet or to convey the two-ply sheet to the purging portion and retry the sheet feeding with said another two-ply sheet, depending on a given number of multi-fed two-ply sheets.

4. The sheet laminator according to claim 3, further comprising an operation device to set the given number of multi-fed two-ply sheets.

5. The sheet laminator according to claim 1, further comprising a sheet processing device disposed downstream from the multi-feeding detector in the conveyance direction, the sheet processing device being configured to perform a first operation to separate the two sheets of the two-ply sheet and a second operation to insert the sheet-shaped medium into the two-ply sheet separated in the first operation,
   wherein the circuitry is configured to, in response to the detection of the multiple feeding of the two-ply sheet, cause the sheet processing device to convey the two-ply sheet to the purging portion without performing the first operation and the second operation.

6. The sheet laminator according to claim 1,
   wherein the purging portion is configured to store a plurality of two-ply sheets including the two-ply sheet.

7. The sheet laminator according to claim 1,
   wherein the purging portion includes a sheet detector configured to detect whether the two-ply sheet is in the purging portion.

8. The sheet laminator according to claim 7, further comprising a notification device configured to output a perceptual signal to a user,
   wherein the circuitry is configured to cause the notification device to notify the user that the two-ply sheet is stored in the purging portion, after the two-ply sheet and the sheet-shaped medium have been laminated.

9. The sheet laminator according to claim 1, further comprising a notification device configured to output a perceptual signal to a user,
   wherein the circuitry is configured to count a number of detections of multiple feeding of the two-ply sheet, and wherein, when a given number of detections of multiple feeding is sequentially counted, the circuitry is configured to interrupt lamination of the two-ply sheet and the sheet-shaped medium and notify the user that the given number of detections of multiple feeding is sequentially counted.

10. The sheet laminator according to claim 1, further comprising a notification device configured to output a perceptual signal to a user, wherein the circuitry is configured to count a number of detections of multiple feeding of the two-ply sheet, and wherein, when the number of detections of multiple feeding of the two-ply sheet counted by the circuitry is equal to or greater than a given cumulative number of detections of multiple feeding of the two-ply sheet, the circuitry is configured to interrupt lamination of the two-ply sheet and the sheet-shaped medium and notify the user that the number of detections of multiple feeding of the two-ply sheet is equal to or greater than the given cumulative number of detections.

11. An image forming apparatus comprising:

the sheet laminator according to claim 1; and an image forming device configured to form an image on a sheet.

12. A sheet laminating method of laminating a two-ply sheet in which two sheets are overlapped and bonded together at one end of the two-ply sheet and a sheet-shaped medium inserted between the two sheets of the two-ply sheet, the sheet laminating method comprising:

feeding the two-ply sheet;

fixing the two-ply sheet by application of heat and pressure;

ejecting the two-ply sheet that has been fixed by the fixing, to an ejection device; and, in response to detection of multiple feeding of the two-ply sheet in the feeding, conveying the two-ply sheet to a purging portion without performing the fixing, and retrying sheet feeding with another two-ply sheet.

* * * * *